United States Patent
Zelnick

[15] 3,701,229
[45] Oct. 31, 1972

[54] METHOD AND APPARATUS FOR SKIN-PACKAGING ARTICLES BETWEEN FILM-ON-FILM

[72] Inventor: Seymour Zelnick, Orange, N.J.

[73] Assignee: Weldotron Corporation, Piscataway, N.J.

[22] Filed: Feb. 19, 1971

[21] Appl. No.: 116,769

[52] U.S. Cl. .................................53/22 A, 53/112 A
[51] Int. Cl. .............................................B65b 31/04
[58] Field of Search ..........................53/22 A, 112 A

[56] References Cited

UNITED STATES PATENTS 3,491,504  1/1970  Young et al..........53/112 A X
3,061,984  11/1962  Mahaffy....................53/22 A Primary Examiner—Travis S. McGehee
Attorney—Harry Cohen

[57] ABSTRACT

There is provided a continuous motion skin-packaging machine and method for the production of air-evacuated see-through film-on-film packages of products. One of the film layers is softened by heat and is contoured around the product. Also, provision may be made for the introduction of an inert fluid, for example, nitrogen, into the package after the removal of air therefrom.

11 Claims, 7 Drawing Figures

INVENTOR.
SEYMOUR ZELNICK

BY

ATTORNEY

METHOD AND APPARATUS FOR SKIN-PACKAGING ARTICLES BETWEEN FILM-ON-FILM

BACKGROUND OF THE INVENTION

1. Field of The Invention

This invention relates to apparatus and a method for skin-packaging products on a continuous basis.

2. Description of The Prior Art

There are, at present, several design approaches to continuous motion skin-packaging machines which produce the conventional type of skin-packaging, namely, contour formed film on a porous board and so form and adhere the upper, preheated web of film. Another type, shown by my assignee's U.S. Pat. No. 3,462,909, utilizes electrostatic forces to contour form the upper, pre-heated web of film and adhere it to the porous board.

However, neither of the above approaches is capable of producing the type of package which is desired and required for many food applications, namely, a contour formed upper web of film adhered to a non-porous lower web of film. Also, the desired package should have the air removed therefrom. This type of package is desirable for the following reasons:

1. The contour formed upper film enhances the appearance of the package.
2. The transparent lower film gives visibility from the bottom also, which is now a requirement for many meat packages.
3. The evacuation of air is a requirement for preservation.

SUMMARY OF THE INVENTION

In accordance with the present invention the products are packaged on a continuous basis between companion thermoplastic see-through films, namely, between a contour formed film adhered to a non-porous companion film whereby the appearance of the package is enhanced and the product is completely visible between the two films. Further, in accordance with the present invention, air is removed from the interior of the package in order to enhance preservation of foods constituting the packaged products, and if desired, an inert fluid, for example, nitrogen, may be introduced in the interior of the package in order to further enhance the preservation. The method and apparatus for providing packages of the above described character constitute the primary objects of the present invention.

BRIEF DESCRIPTION OF THE DRAWINGS

The above and other objects, features and advantages of the invention will be apparent from the following description considered in connection with the accompanying drawings illustrating a presently preferred embodiment of the invention.

In The Drawings.

DESCRIPTION OF THE PREFERRED EMBODIMENT OF THE INVENTION

Figure 1:
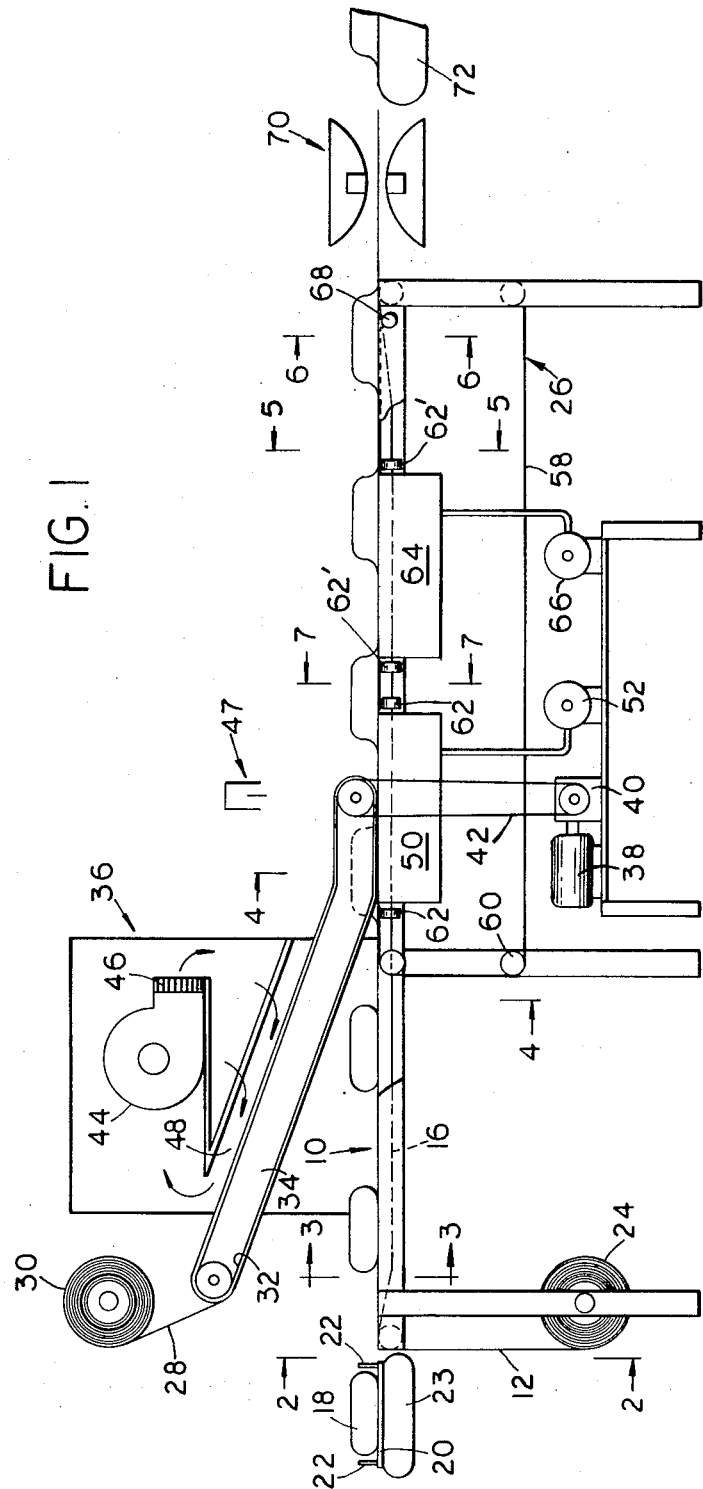
FIG. 1 is a side view, in elevation, of a packaging machine embodying the present invention.
Figure 2:
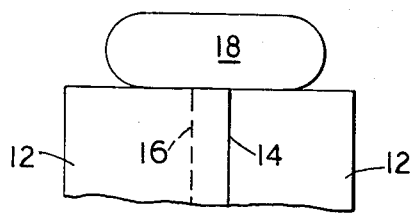
FIG. 2 is a transverse view on the line 2—2 of FIG. 1.
Figure 3:
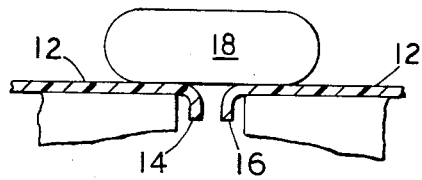
FIG. 3 is a transverse view on the line 3—3 of FIG. 1.
Figure 4:
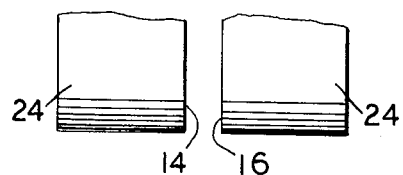
FIG. 4 is a sectional view on the line 4—4 of FIG. 1.
Figure 4:
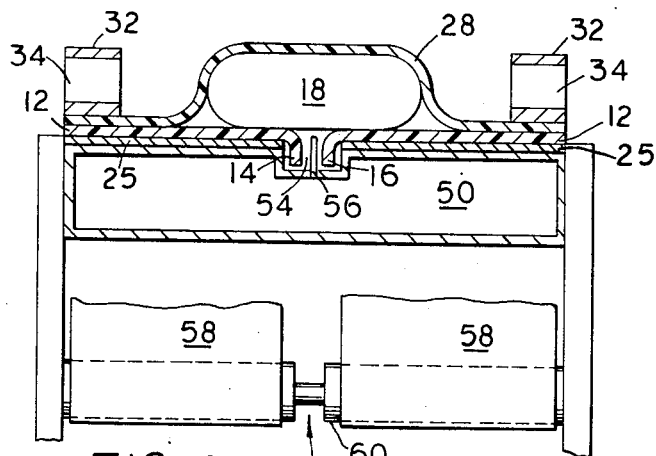
Figure 5:
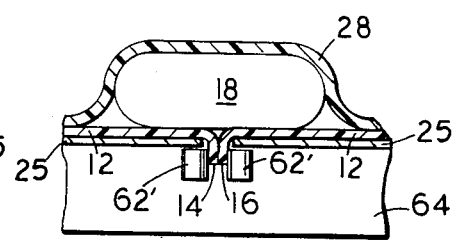
FIG. 5 is a sectional view on the line 5—5 of FIG. 1.

In accordance with the present invention, one of the film layers, here shown as the film layer 10 in FIG. 1, instead of being of continuous width, comprises two parts 12 which are separate from each other and have overlapping portions 14,16 (FIG. 2). The product to be wrapped, indicated at 18, is placed on a stainless steel dead pan 20 and is advanced by flights 22, which are driven by chain 23, onto the film layer 10 which is supplied from the rolls 24 and is moved longitudinally by the upper run 25 of a motor driven conveyor belt 26. The film rolls 24 are spaced laterally of each other and the films 12 are directed toward each other in a known way until they overlap as indicated in FIG. 2. The companion film layer 28 is supplied from roll 30 and is drawn from said roll by vacuum belts 32 (FIG. 4) which ride on two vacuum plenums 34 which are connected to a vacuum pump (not shown). The vacuum belts carry the film 28 through a heating chamber 36 and deposit it against the product and film carried by belt 26 as the latter begins to enter the vacuum chamber hereinafter described. The vacuum belts are driven by a motor 38 through gear reducer 40 and pulley belt 42. The heating chamber comprises an air blower 44 and an electrical resistance element 46 which supplies heated air to the film layer 28 for softening said film layer 28 whereby it is contoured around the individual products in response to the action of vacuum thereon, as hereinafter described, and by the electrostatic pinning forces which may be provided, as disclosed in the above mentioned U.S. Pat. No. 3,462,909, and applied at the point at which film layer 28 is deposited on film layer 10, as indicated at 47 in FIG. 1, to effect a more rapid operation than that possible by reason of the effect of the vacuum chamber. Substantially concurrently with the contouring of the film layer 28 it is heat sealed around the packages to film layer 10. The heated air is recirculated to the inlet of blower 44 from the passage 48.

Figure 7:
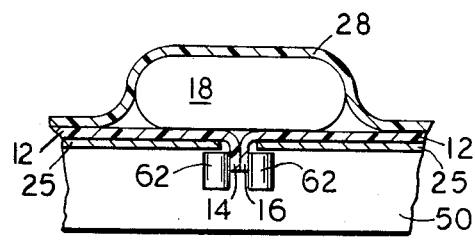
FIG. 7 is a sectional view of the line 7—7 of FIG. 1.

In accordance with this invention and as above indicated, provision is made for evacuating air from the packages which are conveyed in succession longitudinally of the apparatus. For this purpose the apparatus comprises a vacuum chamber 50 which communicates with the vacuum pump 52. The vacuum chamber 50 has a longitudinally extending slot 54 into which the flaps i.e., marginal side edge portions 14 and 16 of the two web parts 12 project, and a longitudinally extending nozzle 56 provides communication between the vacuum chamber 50 and the interior of each package as it moves across the vacuum chamber. The conveyor 26 comprises two laterally spaced belts 58 (FIG. 4) so that the space between said belts, which are driven in any suitable way by the shaft 60, registers with slot 54 which provides communication between the vacuum chamber 50 and the interior of the packages. Squeeze rollers 62 are provided at the inlet and outlet ends of the vacuum chamber 50 to prevent loss of vacuum in the chamber through said ends, it being understood that the abutting ends 14 and 16 of the layers 12 (FIG. 7) squeezed together by the rollers 62 of an overall thickness sufficient to close the inlet and outlet ends of vacuum chamber 50 while said ends 14 and 16 pass into and out of said chamber.

Figure 6:
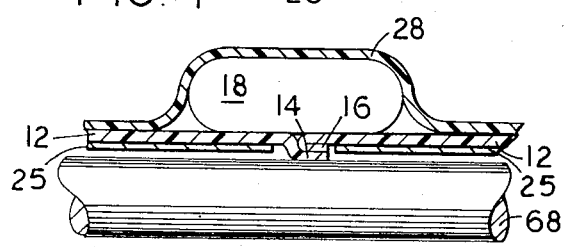
FIG. 6 is a sectional view on the line 6—6 of FIG. 1.

The present invention also provides for the introduction of an inert gas, preferably nitrogen, to augment the preservation of food products packaged in accordance with the invention. For this purpose a chamber 64 is provided in tandem with the vacuum chamber 50 so that as the marginal portions 14 and 16 of the layer 10 pass from the vacuum chamber, they move through the chamber 64 whereby the gas in said chamber is introducted into said package, said gas being supplied to said chamber 64 by a pump indicated at 66. Squeeze rollers indicated at 62', similar to the squeeze rollers 62, engage the film portions 14 and 16 for closing the inlet and outlet ends of the chamber 64 in the same way as the rollers 62 close the inlet and outlet ends of vacuum chamber 50. After the marginal edge portions 14 and 16 exit from the chamber 64 they are heat sealed to each other by rollers 62', at the out end of said chamber, which are electrically heated for this purpose, and said edge portions are flattened against each other by a driven roller 68 (FIG. 6). As the packages move downstream of the roller 68, they are separated from each other, by the operation of the orbital sealing and cutting device indicated at 70 in FIG. 1, and move on to the discharge conveyor 72. The function of this orbital sealing and cutting device 70 is to seal and cut the continuously moving film without requiring interruption of movement of the film. There are many known methods and devices for accomplishing this function, among which are those, for example, shown by U.S. Pat. Nos. 2,951,325 and 3,140,218.

If the gas introduction chamber 64 is omitted from the apparatus the marginal edge portions 14 and 16 are heat sealed to each other by rollers 62 at the outlet end of chamber 50, said rollers being electrically heated for that purpose.

While there has been shown and described the preferred embodiment of the invention, it will be understood that the invention may be embodied otherwise than as herein specifically illustrated or described, and that in the illustrated embodiment certain changes in the details of construction and in the form and arrangement of the parts may be made without departing from the underlying idea and principles of this invention within the scope of the appended claims.

What is claimed is:

1. A method of packaging products, comprising inserting the products in succession between two layers of see-through thermoplastic film, contouring one of said layers to said products, sealing the film layers to each other around the individual products, advancing the film layers and the products therebetween to a vacuum station, and subjecting the interior of the packages to the action of the vacuum at said station.

2. A method according to claim 1, wherein an inert gas is introduced into the packages after they are subjected to the action of the vacuum.

3. A method according to claim 1, wherein the one of said film layers comprises two portions which are adapted to overlap each other laterally but which are separated laterally at the vacuum station in order to subject the interior of the package to the action of the vacuum, and overlapping said portions to close the package after it is subjected to the action of the vacuum.

4. A method according to claim 3, wherein an inert gas is introduced into the packages following the vacuum treatment and before the overlapping operation is performed.

5. Apparatus for packaging products between two layers of see-through film, comprising means for moving said film layers in confronting relation in the direction of their lengths with the products inserted in succession between said layers, means for contouring one of the film layers to the individual products and said layers to each other around the individual products, and means for evacuating air from the sealed packages, said air-evacuating means being operable during the movement of said film layers with the products therebetween.

6. Apparatus for packaging products between two layers of see-through film, comprising means for moving said film layers in confronting relation in the direction of their lengths with the products inserted in succession between said layers, means for contouring one of the film layers to the individual products and said layers to each other around the individual products, and means for evacuating air from the sealed packages, said air-evacuating means comprising a vacuum chamber having a slot through which confronting laterally spaced portions of one of said film layers move longitudinally of the slot, and means disposed between said confronting portions and providing communication between said vacuum chamber and the interior of said packages.

7. Apparatus according to claim 6, wherein means are provided to overlap and heat-seal said portions of the film layers to each other whereby to seal the packages.

8. Apparatus for packaging products between two layers of see-through film, comprising means for moving said film layers in confronting relation in the direction of their lengths with the products inserted in succession between said layers, means for contouring one of the film layers to the individual products and said layers to each other around the individual products, and means for evacuating air from the sealed packages, said air-evacuating means comprising a vacuum chamber having a slot through which confronting laterally spaced portions of one of said film layers move longitudinally of the slot, and means disposed between said confronting portions and providing communication between said vacuum chamber and the interior of said packages and wherein means are provided for introducing an inert gas into said packages following the operation of the air evacuation means.

9. Apparatus for packaging products between two layers of see-through film, comprising means for moving said film layers in confronting relation in the direction of their lengths with the products inserted in succession between said layers, means for contouring one of the film layers to the individual products and said layers to each other around the individual products, and means for evacuating air from the sealed packages, said air-evacuating means comprising a vacuum chamber having a slot through which confronting laterally spaced portions of one of said film layers move longitudinally of the slot, and means disposed between said confronting portions and providing communication between said vacuum chamber and the interior of said packages and wherein means are provided for introducing an inert gas into said packages following the operation of the air-evacuation means, and means to overlap and heat-seal said portions of the film layers to each other whereby to seal the packages.

10. Apparatus for packaging products between two layers of see-through film, comprising means for moving said film layers in confronting relation in the direction of their lengths with the products inserted in succession between said layers, means for contouring one of the film layers to the individual products and said layers to each other around the individual products, and means for evacuating air from the sealed packages, the means for moving one of said film layers in confronting relation to the other of said film layers comprising laterally spaced belts engageable with said one film layer at the opposite longitudinal side edge portions of the latter, and means for heating and thereby softening said one film layer to condition it for contouring around the products and for heat sealing said layers to each other around the individual products during the movement of said layers by said belts, and vacuum chambers associated with said belts, respectively, for engaging said one film layer with said belts, respectively.

11. Apparatus according to claim 10, wherein said vacuum chambers are stationary and said belts are endless and are movable longitudinally of said vacuum chambers, respectively.

* * * * *